United States Patent [19]

Moore

[11] Patent Number: 5,685,470
[45] Date of Patent: Nov. 11, 1997

[54] REMOVABLE STORAGE APPARATUS

[76] Inventor: Donal Moore, 2190 Northlawn, Birmingham, Mich. 48009

[21] Appl. No.: 540,503

[22] Filed: Oct. 6, 1995

[51] Int. Cl.$^6$ .................................................. B60R 9/06
[52] U.S. Cl. ..................... 224/567; 224/545; 224/547; 224/555
[58] Field of Search ..................... 224/545, 547, 224/549, 555, 557, 563, 572; 410/97, 98, 101, 104, 105, 117, 142; 220/529, 530, 532, 533, 534, 535, 551, 552

[56] References Cited

U.S. PATENT DOCUMENTS

| | | |
|---|---|---|
| 1,837,537 | 12/1931 | Emerson . |
| 2,532,713 | 6/1946 | Gottfried ................................. 160/388 |
| 2,705,461 | 4/1955 | Campbell ................................ 105/369 |
| 2,950,691 | 6/1958 | Huber ..................................... 410/118 |
| 2,986,315 | 5/1961 | Zimmerman ......................... 224/42.32 |
| 3,438,673 | 4/1969 | Nelson .................................... 105/369 |
| 3,986,656 | 10/1976 | November .............................. 229/15 |
| 4,189,056 | 2/1980 | Majewski ................................ 211/195 |
| 4,964,771 | 10/1990 | Callihan ................................... 410/118 |
| 5,012,963 | 5/1991 | Rosenbaum .......................... 224/42.46 |
| 5,026,231 | 6/1991 | Moore ...................................... 410/118 |
| 5,040,711 | 8/1991 | Neidenhauser et al. ............ 224/42.46 |
| 5,040,934 | 8/1991 | Ross ........................................ 410/97 |
| 5,058,786 | 10/1991 | Politi ...................................... 224/42.32 |
| 5,090,856 | 2/1992 | Moore ..................................... 410/118 |
| 5,118,019 | 6/1992 | Harrison ............................... 224/42.46 |
| 5,121,958 | 6/1992 | Goeden et al. ........................ 246/37.1 |
| 5,167,433 | 12/1992 | Ryan ....................................... 220/533 |
| 5,186,587 | 2/1993 | Moore ..................................... 410/118 |
| 5,265,993 | 11/1993 | Wayne .................................... 220/533 |
| 5,340,004 | 8/1994 | Moore ................................... 224/42.46 |
| 5,368,210 | 11/1994 | Wotring ................................ 224/42.46 |
| 5,427,486 | 6/1995 | Green ..................................... 296/24.1 |
| 5,542,591 | 8/1996 | Moore et al. .......................... 224/547 |

FOREIGN PATENT DOCUMENTS 223680  6/1985  Germany .

OTHER PUBLICATIONS

Merkur XR4Ti, 1985 Owners Guide, Jun. 1984.
One Sheet of Figures (untitled) (undated).

*Primary Examiner*—Henry J. Recla
*Assistant Examiner*—Charles R. Eloshwway
*Attorney, Agent, or Firm*—Young & Basile, P.C.

[57] ABSTRACT

A removable storage apparatus comprises a mechanism for subdividing a stowage area into at least two discrete subsections. A mechanism is provided for removably attaching the subdividing mechanism to a desired surface. The removable attaching mechanism comprises at least one side panel mounted on the desired surface, and two matingly engageable coupling members, one member disposed on the subdividing means, and the other member disposed on the side panel.

21 Claims, 4 Drawing Sheets

5,685,470

REMOVABLE STORAGE APPARATUS

BACKGROUND OF THE INVENTION

The present invention relates generally to storage apparatus, and more particularly to a removable storage apparatus.

Consumers continually seek more efficient, convenient and versatile ways to transport or store contents to be stowed in a motor vehicle such as a van, automobile, four wheel drive off-the-road vehicle, or in a closet or the like. For transportation, conventional means of stowage have consisted mainly in trunk space, beds of pick-up trucks, or the area behind the rear seats in a van. In closets and the like, conventional means of stowage have been shelves, "closet organizers", or simply the closet floor. These means have served their purpose satisfactorily, however, several drawbacks exist.

One disadvantage of the examples cited above is that stowage is freely movable within the stowage compartment, and can be damaged in the event of a sudden stop, or jostling when looking for an item or adding another item to the stowage. Further, conventional stowage transporting/storage means generally have only one large compartment, and it is difficult to transport a mixture of heavy items with more delicate or fragile items. Still further, closet shelves can be very difficult to reach, and "closet organizers" can be quite bulky and space consuming. Yet still further, conventional stowage transporting/storage means generally contain only one or two configurations for storage, thereby limiting their versatility. Still further, these conventional storage means are generally too bulky and/or complicated to attach/detach to remove and replace on a regular basis.

Thus, it is an object of the present invention to provide a removable storage net which will advantageously provide safety to contents to be stowed. It is a further object of the present invention to provide a net which will prevent stowage from inadvertently leaving the net and/or netted area during jostling, and will also aid in noise attenuation of the stowage during such jostling and/or other movement. It is a further object of the present invention to provide a net which can divide a single stowage transporting area into one or more discrete and sectioned areas within the stowage area. It is yet another object of the present invention to provide a net which is quickly attachable/detachable from a side panel, which panel itself may further divide the stowage area into yet one or more discrete stowage areas. Still further, it is an object of the present invention to provide such a net which is strong and resilient, yet lightweight, thereby preserving fuel efficiency.

SUMMARY OF THE INVENTION

The present invention addresses and solves the above-mentioned problems by providing a removable storage apparatus, comprising means for subdividing a stowage area into at least two discrete subsections. The apparatus further comprises means for removably attaching the subdividing means to a desired surface. The removable attaching means comprises at least one side panel mounted on the desired surface, and two matingly engageable coupling members, one member disposed on the subdividing means, and the other member disposed on the side panel.

BRIEF DESCRIPTION OF THE DRAWINGS

Other objects, features and advantages of the present invention will become apparent by reference to the following detailed description and to the drawings, in which.

DETAILED DESCRIPTION OF THE PREFERRED EMBODIMENTS

Figure 1:
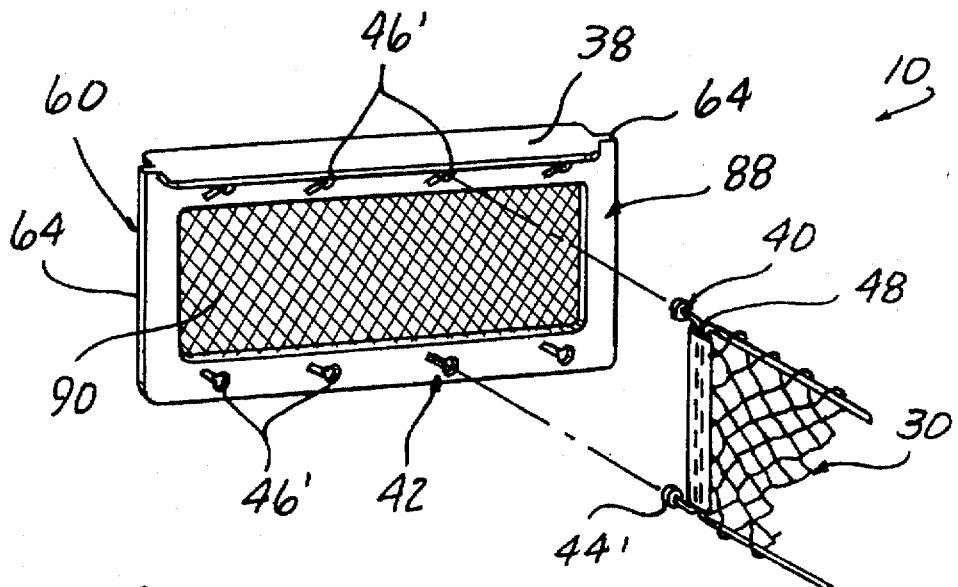
FIG. 1 is a perspective view of the side panel shown with the net of the present invention exploded away and partially cut away.
Figure 2:
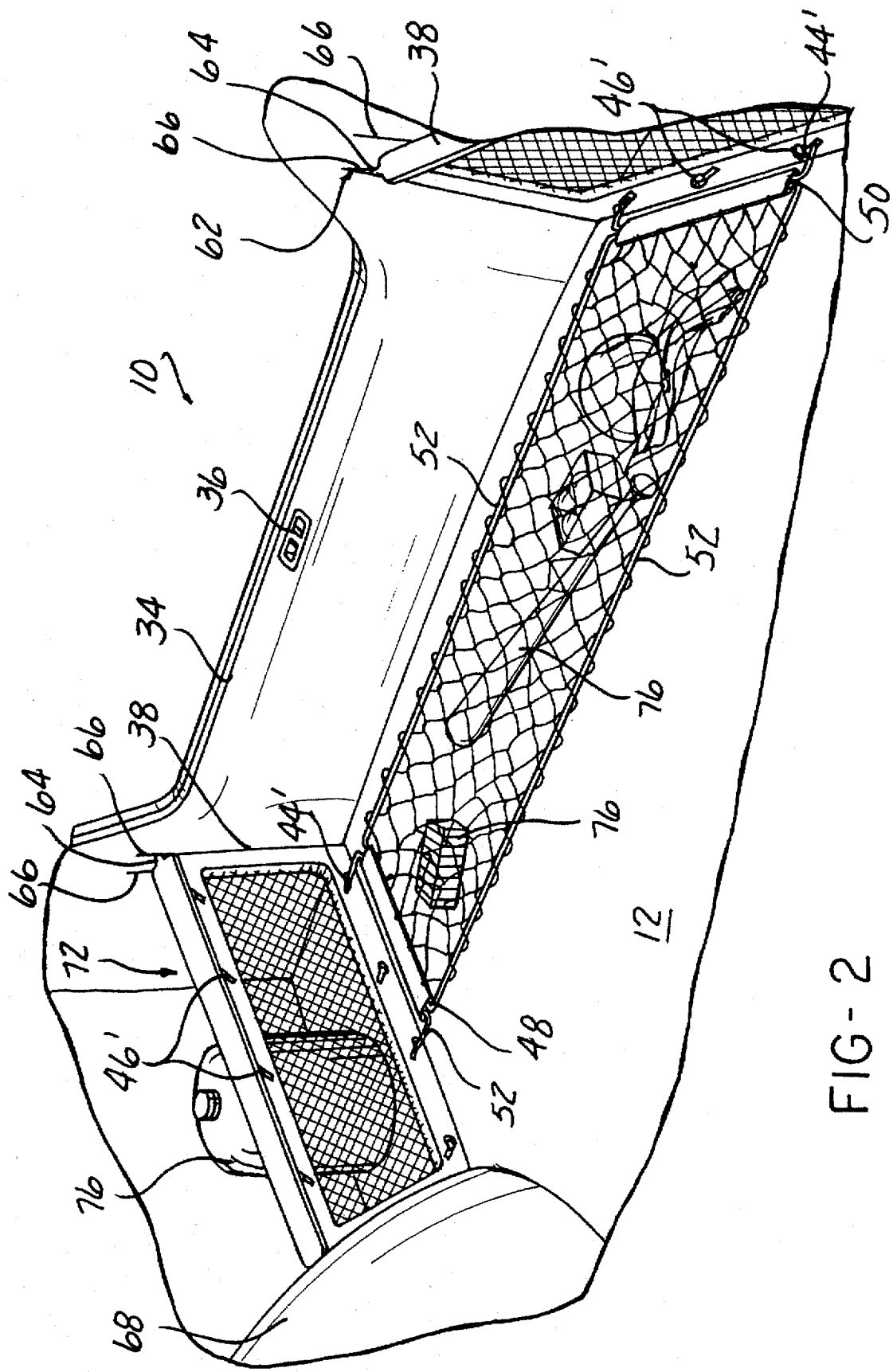
FIG. 2 is a cutaway perspective view of the net of one embodiment of the present invention, shown in a trunk compartment, having stowage thereunder and attached to two side panels, one of the side panels shown forming a further, discrete stowage compartment with stowage therein.
Figure 8A:
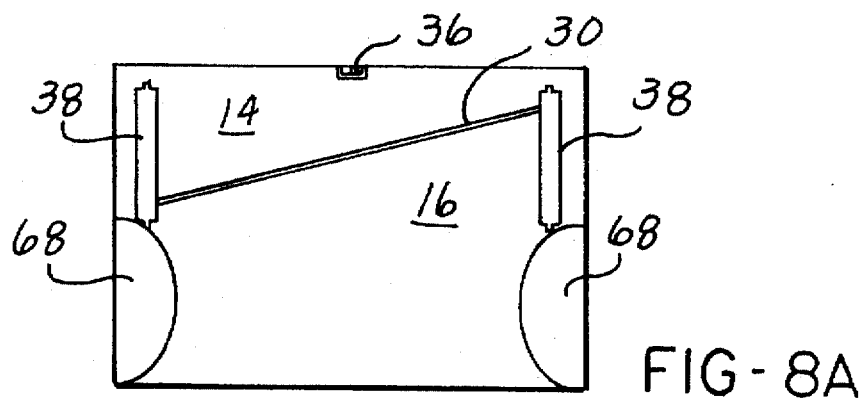
FIG. 8A is a top, semi-schematic view of the net of the present invention, showing it attached diagonally between two side panels.
Figure 8B:
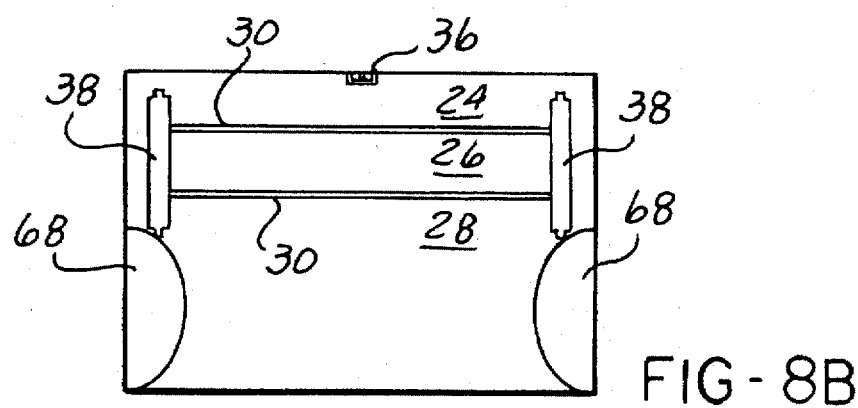
FIG. 8B is a top, semi-schematic view showing two nets of the present invention attached side by side between two side panels.

Referring now to FIGS. 1 and 2, the removable storage apparatus of the present invention is designated generally as 10. Removable storage apparatus 10 comprises means for subdividing a stowage area 12 into at least two discrete subsections 14, 16, as best seen in FIG. 8A. It is to be understood that stowage area 12 may be subdivided into any number of subsections. For example, in FIGS. 5 and 9, there are shown three discrete subsections 18, 20 and 22. In FIG. 8B, depending upon the type of subdividing means used, there are shown at least three discrete subsections 24, 26 and 28. It is to be understood that these examples are illustrative and are not to be construed as limiting.

Returning again to FIG. 1, it is to be understood that the subdividing means may comprise any suitable means. However, in the preferred embodiment, the subdividing means comprises at least one netting member 30. It is to be understood that netting member 30 may further be formed in any suitable shape and of any suitable material, as desired. Illustrative, non-limiting examples of various netting members are disclosed in U.S. Pat. No. 5,340,004, which is incorporated herein by reference. Still further, netting member 30 could be a barrier net at an automobile trunk forward end and suspended between the automobile passenger compartment and the automobile trunk compartment, such as that disclosed in U.S. Pat. Nos. 5,026,231; 5,090,856; and 5,186,587.

Figure 9:
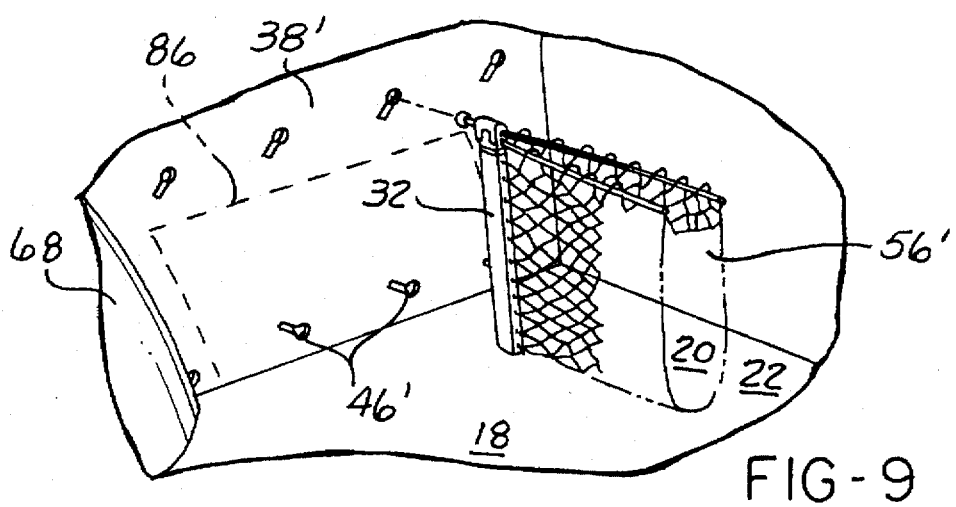
FIG. 9 is a cutaway perspective view showing a further embodiment of the net of the present invention, shown attached directly to an automotive side molding.

In addition, a suitable flexibly rigid side bracket 32, as seen in FIG. 9, may be disposed on netting member 30. This side bracket 32 is more fully disclosed in my co-pending application U.S. Ser. No. 08/306,643, filed Sep. 15, 1994, which is also incorporated herein by reference.

Figure 5:
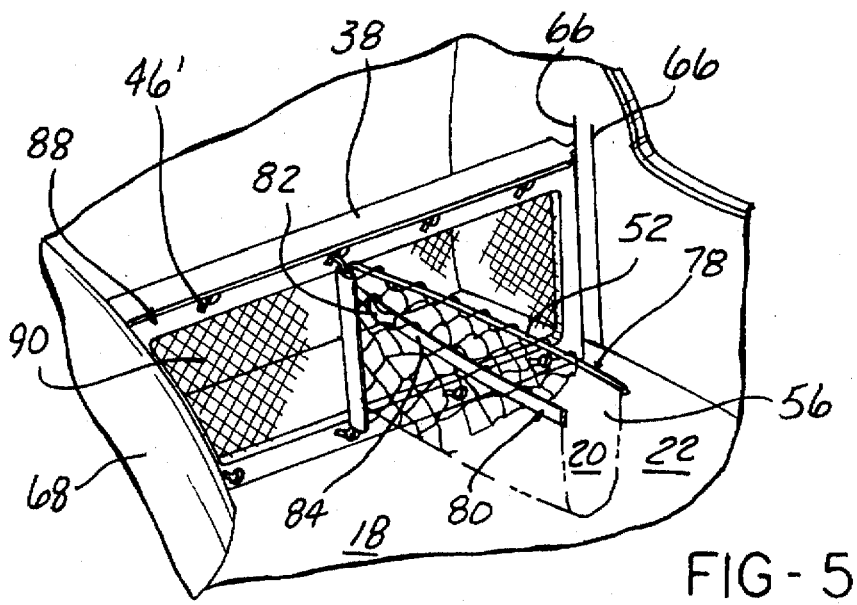
FIG. 5 is a cutaway perspective view of another embodiment of the net of the present invention.
Figure 6:
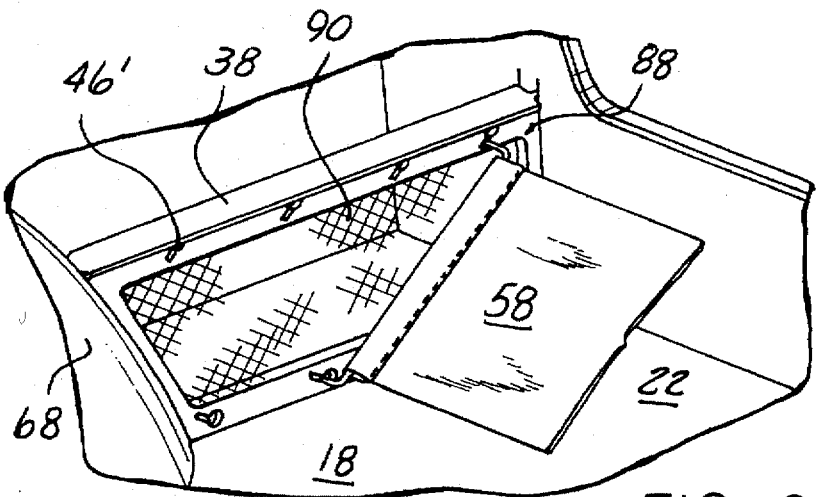
FIG. 6 is a cutaway perspective view of another embodiment of the net of the present invention, showing a net formed with non-netting material.

Some examples of suitable materials from which netting member 30 may be formed include, but are not limited to: a woven, knitted or rochelle nylon netting material or other natural or synthetic material, as shown in FIGS. 1, 2, 5 and 9; a woven or non-woven solid material from either natural or synthetic materials, as shown in FIG. 6; and a flexible solid or perforated member formed from a suitable polymeric, metallic, natural or synthetic material, for example a vinyl material or a canvas material.

The removable storage apparatus 10 further comprises means for removably attaching the subdividing means to a desired surface. As shown in the Figures, the subdividing means is netting member 30, and the desired surface is an automotive stowage area 12. It is to be understood that the desired surface may further be any place where storage/convenience compartmentalizing may be desirable, necessary and/or needed such as, for example, closets and the like. In the Figures, a trunk compartment 34 is depicted, with the deck lid broken away, and deck lid latch designated as 36. It is to be further understood that the present invention may be used in any vehicle such as an automobile, boat and the like. Aside from automobiles having trunks 34 as shown, for motor vehicles, a few examples include any which have a rear facing door, such as a tailgate, hatch, and the like.

It is to be understood that the removable attaching means may comprise any suitable means. However, in the preferred embodiment, the removable attaching means comprises at least one side panel 38 mounted on the desired surface, and two matingly engageable coupling members 40, 42, one member 40 disposed on the subdividing means, and the other member 42 disposed on the side panel 38.

It is to be understood that the coupling members 40, 42 may comprise any suitable coupling members; however, in the preferred embodiment, coupling members 40, 42 comprise a male member 44 extending outwardly from either the netting member 30 or the side panel 38. Coupling members 40, 42 further comprise a female member 46 defined in either the side panel 38 or the netting member 30. Female member 46 is complementarily shaped to the male member 44.

In the preferred embodiment, there are two opposed side panels 38, as best seen in FIG. 2, and the netting member 30 extends between the two side panels 38, with the netting member first end 48 attachable to one side panel 38, and the netting member second end 50 attachable to a second side panel 38. However, it is to be understood that there may be more or fewer side panels 38 as desired—for example, depending upon the desired end use, the positioning of the panels 38 may be different. Further, one end 48 of the netting member 30 may be fixedly or removably attached directly to the desired surface, with the other end 50 of netting member 30 removably attachable to a single side panel 38.

Figure 4A:
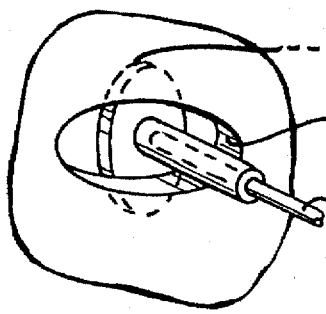
FIG. 4A is an enlarged perspective view showing one net-to-side panel attaching means.
Figure 4B:
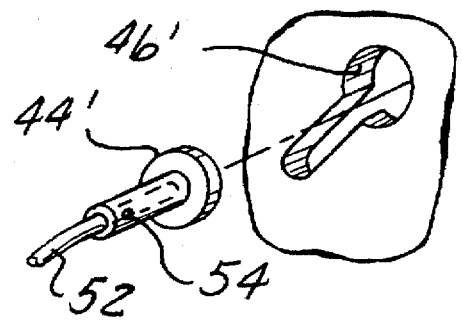
FIG. 4B is an enlarged, exploded perspective view showing another net-to-side panel attaching means.

It is to be understood that the male member 44 and the female member 46 may be formed from any suitable material and of any suitable shape. However, in the preferred embodiment as seen in FIG. 4A, male member 44 is a first key member disposed on the first end 48, and a second key member disposed on the second end 50. An elastic, "bungee" type cord 52 may be fixedly attached to member 46 by any suitable means, such as integrally molding cord 52 within member 46, as shown, mechanical tacking, and the like. Female member 46 is a first key slot defined in one of the two side panels 38, and a second key slot defined in the other of the two side panels 38. A further preferred embodiment is shown in FIG. 4B, depicting male member 44' and female member 46', shown at an angular orientation. Such angular orientation may help to keep netting member 30 locked in place during movement of items stowed during jostling or transport. Elastic, "bungee" type cord 52 may be fixedly attached to member 46' by any suitable means, such as integrally molding cord 52 within member 46', or by any suitable mechanical tack 54, as shown, or the like.

It is to be understood that there may be any number of key members/key slots. In the preferred embodiment, as best seen in FIGS. 1 and 2, each of the side panels 38 has a plurality of angularly oriented, quick release key slots 46', and each of the netting member first 48 and second 50 ends has at least two mating key members 44' for releasably locking within at least two of the plurality of angularly oriented, quick release key slots. Given this plurality of key slots 46', there are a vast number of permutations for connecting netting member 30 between two side panels 38. Illustrative, non-limiting examples follow.

Figure 7A:
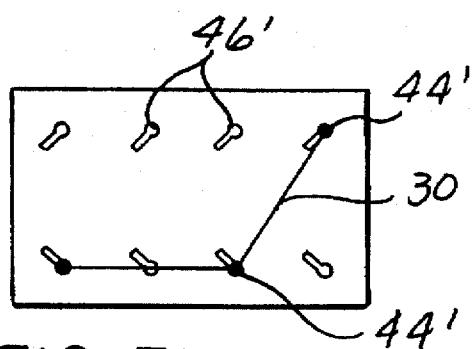
FIG. 7A is a schematic view of a first exemplary configuration of a net of the present invention attached to a side panel.
Figure 7B:
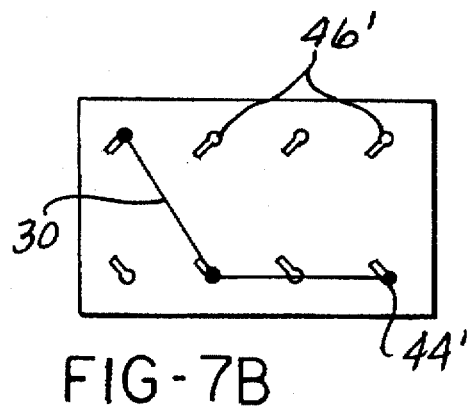
FIG. 7B is a schematic view of a second exemplary configuration of a net of the present invention attached to a side panel.
Figure 7C:
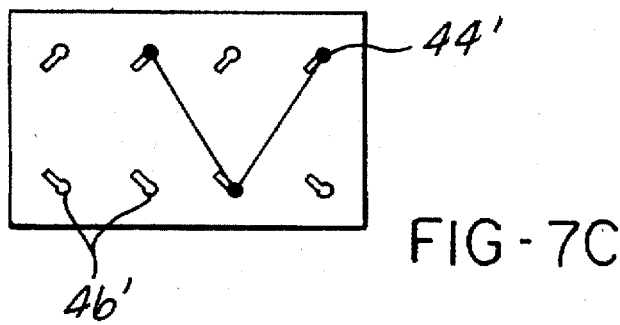
FIG. 7C is a schematic view of a third exemplary configuration of a net of the present invention attached to a side panel.

FIG. 2 shows netting member 30 extending horizontally along the floor of the stowage area 12; the subsections are below the member 30 and above it, as well as the rest of the area 12 floor. FIG. 5 shows a storage net 56 extending vertically, perpendicularly between two side panels 38; the subsections 18, 20 and 22 are shown. FIG. 6 shows non-netting solid member 58 extending vertically, angularly between two side panels 38; the subsections 18 and 22 are shown. FIG. 9 shows a storage net 56' extending vertically, perpendicularly between two side panels 38; the subsections 18, 20 and 22 are shown. FIGS. 7A and 7B show configurations wherein one or more netting members 30 attach both horizontally and angularly; and FIG. 7C shows a configuration wherein netting member 30 is in a V-type shape. FIG. 8A is a top view showing netting member extending vertically, perpendicularly, but angularly with respect to side panels 38; the subsections 14 and 16 are shown. FIG. 8B is a top view showing two netting members 30 extending side by side; the subsections 24, 26 and 28 are shown. It is to be understood that these configurations are only exemplary; and that any attachment of any type of netting member 30 (examples of which are set out more fully above) to any key slot 46' are contemplated as being within the scope of the present invention.

The removable storage apparatus may further comprise means for detachably mounting the side panel 38 on the desired surface, such as automotive stowage area 12. It is to be understood that this detachable mounting means may comprise any suitable means; however, in the preferred embodiment, this means comprises two matingly engageable couplers, one coupler 60 disposed on the side panel 38, and the other coupler 62 disposed on the desired surface. It is to be understood that these couplers 60, 62 may be of any suitable size, shape, and of any material. However, in the preferred embodiment, couplers 60, 62 comprise a male projection 64 extending outwardly from either the side panel 38 or the desired surface 12; and a female portion 66 defined in either the desired surface 12 or the side panel 38, respectively, and complementarily shaped to the male projection 64.

Figure 3:
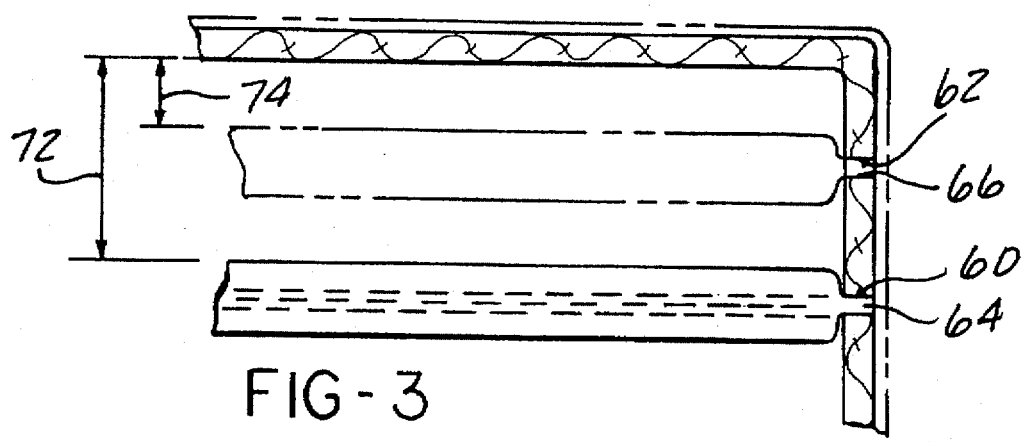
FIG. 3 is an enlarged top view of a side panel, partially cut away, shown forming a first stowage compartment, with a side panel shown in phantom forming a second stowage compartment.

As best seen in FIGS. 2 and 3, the male projection 64 is disposed and is integrally formed on the side panel 38, and the female portion 66 is defined in the automotive stowage area 12. In a further preferred embodiment there are at least two female portions 66 comprising grooves integrally formed both in the wheel housing 68 and in the trunk wall 70 opposed to the wheel housing 68. When side panel 38 is coupled to the inwardmost opposed female portions 66, a first discrete stowage area 72 is formed. When side panel 38 is coupled to the outwardmost opposed female portions 66, a second discrete stowage area 74 is formed. This provides for additional compartmentalized storage of various items 76 to be stowed. Bulkier items may be stowed in area 72, while less bulky items such as jumper cables, netting members 30 not in use, and the like may be stowed in area 74.

With the items stowed in areas 72, 74, and/or in any of the various discrete subsections, eg. 14, 16, 18 etc., items are prevented from moving more than a predetermined distance in any direction. This distance may be determined by, for example, which stowage area 72, 74 is desired to be formed; as well as the type of netting member 30 used.

For example, the embodiments shown in FIGS. 1, 2 and 9 are particularly useful for light objects which may experience a low G-force. The embodiment shown in FIG. 5 is particularly useful for heavier objects which may experience a substantial G-force. Elastic cord 52 extends the full length of front edge 78, and is in the position which faces, eg. the tailgate. An elastic member attached to back edge 80 comprises an elastic band 82 attached to and spaced from a flexible, substantially inelastic strap 84. The elastic band 82 may be attached to strap 84 by any suitable means, such as stitching or mechanical tacking. The elastic band 82 will allow a certain degree of longitudinal movement, however, the inelastic strap 84 will limit this movement when strap 84 is extended to its full length and elastic band 82 is closely adjacent and parallel to inelastic strap 84. It is to be understood that the band 82/strap 84 arrangement may extend along one or both of the front 78 and back 80 edges.

As such, the apparatus of the present invention restrains items stowed in, underneath, behind or in front of the netting member 30 from moving more than a predetermined distance in any direction. Another advantage of the netting member 30 shown in FIGS. 5 and 9 is that, after stowing items within the net 56, 56', front and back edges 78, 80 will come together tightly enough to prevent stowage from falling out of the top of the net.

In an alternate embodiment of the present invention, the side panel 38' is integrally molded in the desired surface, as best seen in FIG. 9. The side panel 38 may further be hingedly or otherwise mounted on the desired surface 12, to define a stowage compartment 86 between the side panel 38' and the desired surface 12.

The present invention may further comprise means, disposed on the netting member 30 and/or the side panel 38, for providing noise attenuation for items stowed in the storage apparatus; and means, disposed on the netting member 30 and/or the side panel 38, for providing ventilation for items stowed in the storage apparatus. Each of these means may comprise any suitable means, and it is to be understood that one or separate structural aspects may comprise these means. In the preferred embodiment, the side panel 38 includes a frame 88, and side panel 38 noise attenuation means and ventilation means comprise a woven nylon netting material 90 disposed within the side panel frame 88. Also in the preferred embodiment, the netting member 30 noise attenuation means and ventilation means comprise the subdividing means being formed from a woven nylon netting material. This soft material will generally make little or no noise when items 76 strike it, and also provides ventilation, thereby helping to prevent malodorous fumes from building in the stowage areas 72, 74 or in the discrete subsections 14, 16, 18, etc.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A removable storage apparatus, comprising:

means for subdividing a stowage area into at least two discrete subsections;

means for removably attaching the subdividing means to a desired surface, wherein the removable attaching means comprises:

at least one side panel mounted on the desired surface; and two matingly engageable coupling members, one member disposed on the subdividing means, and the other member disposed on the side panel;

means for detachably mounting the side panel on the desired surface, wherein the detachable mounting means comprises two matingly engageable couplers, one coupler disposed on the side panel, and the other coupler disposed on the desired surface, wherein there are at least two couplers disposed on the desired surface, and wherein a first discrete stowage area is formed when the side panel is coupled to one of the at least two couplers, and wherein a second discrete stowage area is formed when the side panel is coupled to the other of the at least two couplers;

means, disposed on the side panel, for providing noise attenuation for items stowed in at least one of the first and second discrete stowage areas; and means, disposed on the side panel, for providing ventilation for items stowed in at least one of the first and second discrete stowage areas.

2. The removable storage apparatus as defined in claim 1 wherein the couplers comprise:

a male projection extending outwardly from one of the side panel and the desired surface; and a female portion defined in the other of the side panel and the desired surface, and complementarily shaped to the male projection.

3. The removable storage apparatus as defined in claim 2 wherein the male projection is disposed on the side panel, and wherein the female portion is defined in the desired surface.

4. The removable storage apparatus as defined in claim 1 wherein the side panel is hingedly mounted on the desired surface, and wherein a stowage compartment is defined between the side panel and the desired surface.

5. The removable storage apparatus as defined in claim 1 wherein the subdividing means comprises at least one netting member.

6. The removable storage apparatus as defined in claim 1 wherein items stowed in the discrete subsection are prevented from moving more than a predetermined distance in any direction.

7. The removable storage apparatus as defined in claim 1 wherein the desired surface is an automotive stowage area.

8. The removable storage apparatus as defined in claim 1 wherein the coupling members comprise:

a male member extending outwardly from one of the subdividing means and the side panel; and a female member defined in the other of the subdividing means and the side panel, and complementarily shaped to the male member.

9. The removable storage apparatus as defined in claim 8 wherein there are two opposed side panels, and wherein the subdividing means extends between the two side panels.

10. The removable storage apparatus as defined in claim 9 wherein the subdividing means comprises a netting member having a first end and a second end, and wherein the male member is a first key member disposed on the first end, and a second key member disposed on the second end, and further wherein the female member is a first key slot defined in one of the two side panels, and a second key slot defined in the other of the two side panels.

11. The removable storage apparatus as defined in claim 10 wherein each of the side panels has a plurality of angularly oriented, quick release key slots and wherein each of the netting member first and second ends has at least two mating key members for releasably locking within at least two of the plurality of angularly oriented, quick release key slots.

12. The removable storage apparatus as defined in claim 1, further comprising:
   means, disposed on the subdividing means, for providing noise attenuation for items stowed in the storage apparatus; and
   means, disposed on the subdividing means, for providing ventilation for items stowed in the storage apparatus.

13. The removable storage apparatus as defined in claim 12 wherein the subdividing means noise attenuation means and ventilation means comprise the subdividing means being formed from a woven nylon netting material.

14. The removable storage apparatus as defined in claim 1 wherein the side panel includes a frame, and wherein the side panel noise attenuation means and ventilation means comprise a woven nylon netting material disposed within the side panel frame.

15. A removable storage apparatus, comprising:
   means for subdividing a stowage area into at least two discrete subsections, wherein the subdividing means comprises at least one netting member having a first end and a second end;
   means for removably attaching the subdividing means to an automotive stowage area, wherein the removable attaching means comprises:
      two opposed side panels mounted on the automotive stowage area, wherein the netting member extends therebetween; and
      two matingly engageable coupling members, one member comprising a male member extending outwardly from one of the netting member and each of the side panels, and the other member comprising a female member defined in the other of the netting member and each of the side panels, and complementarily shaped to the male member;
   means, disposed on the netting member, for providing noise attenuation for items stowed in the storage apparatus;
   means, disposed on the netting member, for providing ventilation for items stowed in the storage apparatus, wherein the netting member noise attenuation means and ventilation means comprise the netting member being formed from a woven nylon netting material;
   wherein items stowed in the discrete subsections are prevented from moving more than a predetermined distance in any direction; and
   means for detachably mounting each of the opposed side panels on the automotive stowage area, wherein the detachable mounting means comprises two matingly engageable couplers, one coupler comprising a male projection extending outwardly from one of each of the side panels and the automotive stowage area, and the other coupler comprising a female portion defined in the other of each of the side panels and the automotive stowage area, and complementarily shaped to the male projection;
   wherein there are at least two couplers adapted to detachably mount one of the side panels, the at least two couplers disposed on the automotive stowage area, and wherein a first discrete stowage area is formed when the one of the side panels is coupled to one of the at least two couplers, and wherein a second discrete stowage area is formed when the one of the side panels is coupled to the other of the at least two couplers.

16. The removable storage apparatus as defined in claim 15 wherein the male member is a first key member disposed on the netting member first end, and a second key member disposed on the netting member second end, and wherein the female member is a first key slot defined in one of the two opposed side panels, and a second key slot defined in the other of the two side panels.

17. The removable storage apparatus as defined in claim 16 wherein each of the side panels has a plurality of angularly oriented, quick release key slots and wherein each of the netting member first and second ends has at least two mating key members for releasably locking within at least two of the plurality of angularly oriented, quick release key slots.

18. The removable storage apparatus as defined in claim 15 wherein the male projection is disposed on each of the side panels, and wherein the female portion is defined in the automotive stowage area.

19. The removable storage apparatus as defined in claim 15 wherein the side panel is hingedly mounted on the automotive stowage area, and wherein a stowage compartment is defined between the side panel and the desired surface.

20. The removable storage apparatus as defined in claim 15, further comprising:
   means, disposed on the side panel, for providing noise attenuation for items stowed in at least one of the first and second discrete stowage areas; and
   means, disposed on the side panel, for providing ventilation for items stowed in at least one of the first and second discrete stowage areas.

21. The removable storage apparatus as defined in claim 20 wherein the side panel includes a frame, and wherein the side panel noise attenuation means and ventilation means comprise a woven nylon netting material disposed within the side panel frame.

* * * * *